US009879629B2

(12) United States Patent
Chiba

(10) Patent No.: US 9,879,629 B2
(45) Date of Patent: Jan. 30, 2018

(54) ABNORMALITY DIAGNOSIS APPARATUS AND ABNORMALITY DIAGNOSIS METHOD FOR INTERNAL COMBUSTION ENGINE SYSTEM

(71) Applicant: Mitsubishi Heavy Industries, Ltd., Tokyo (JP)

(72) Inventor: Junichi Chiba, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 15/115,066

(22) PCT Filed: Dec. 18, 2014

(86) PCT No.: PCT/JP2014/083578
§ 371 (c)(1),
(2) Date: Jul. 28, 2016

(87) PCT Pub. No.: WO2015/114985
PCT Pub. Date: Aug. 6, 2015

(65) Prior Publication Data
US 2016/0348602 A1     Dec. 1, 2016

(30) Foreign Application Priority Data

Jan. 30, 2014  (JP) ................... 2014-015220

(51) Int. Cl.
*F02D 41/20*     (2006.01)
*F02D 41/06*     (2006.01)
(Continued)

(52) U.S. Cl.
CPC .......... *F02D 41/22* (2013.01); *F02D 35/023* (2013.01); *F02D 41/062* (2013.01); *F02N 9/04* (2013.01);
(Continued)

(58) Field of Classification Search
CPC ...... F02D 41/22; F02D 41/062; F02D 35/023; F02D 2200/00; F02D 2200/02; F02N 9/04; F02N 11/0848; Y02T 10/40
See application file for complete search history.

(56) References Cited

U.S. PATENT DOCUMENTS 3,626,918 A * 12/1971 Brenneke ............... F02N 9/04
123/179.31
6,125,808 A * 10/2000 Timewell ............... F02N 9/04
123/179.31
2013/0071260 A1   3/2013 Worden et al.

FOREIGN PATENT DOCUMENTS

CN    101213365 A    7/2008
CN    101952578 A    1/2011
(Continued)

OTHER PUBLICATIONS

Notification Concerning Transmittal of International Preliminary Report on Patentability, App. No. PCT/JP2014/083578, filed Dec. 18, 2014, dated Aug. 11, 2016, 10 Pages.
(Continued)

*Primary Examiner* — Hieu T Vo
*Assistant Examiner* — Arnold Castro
(74) *Attorney, Agent, or Firm* — Berkeley Law & Technology Group, LLP

(57) ABSTRACT

An object is to provide a starting diagnosis apparatus for an internal combustion engine system, capable of diagnosing an abnormal location of an internal combustion engine system. The starting diagnosis apparatus includes: a pressure sensor 35 which measures a cylinder pressure for each of the cylinders; a starting confirming unit 91 which confirms whether the internal combustion engine system fails to start; a cylinder-pressure increase confirming unit 92 which confirms an increase of the cylinder pressure for each of the plurality of cylinders, on the basis of a pressure measure-
(Continued)

ment result of the pressure sensor 35, if the starting confirming unit 91 confirms a failure; a normal-cylinder confirming unit 93 which confirms whether the cylinder for which the increase of the cylinder pressure is confirmed by the cylinder-pressure increase confirming unit 92 is a normal cylinder; and a diagnosing unit 96 which diagnoses an abnormal location of the internal combustion engine system on the basis of confirmation results of the cylinder-pressure increase confirming unit 92 and the normal-cylinder confirming unit 93.

7 Claims, 5 Drawing Sheets

(51) Int. Cl.
   *F02D 35/02* (2006.01)
   *F02N 9/04* (2006.01)
   *F02D 41/22* (2006.01)
   *F02N 11/08* (2006.01)

(52) U.S. Cl.
   CPC ...... *F02D 2200/02* (2013.01); *F02N 11/0848* (2013.01); *F02N 2200/00* (2013.01); *Y02T 10/40* (2013.01)

(56) References Cited

FOREIGN PATENT DOCUMENTS

| | | |
|---|---|---|
| CN | 102094722 A | 6/2011 |
| FR | 2973447 A1 | 5/2012 |
| JP | S63295859 A | 12/1988 |
| JP | 610809 A | 1/1994 |
| JP | 745858 B2 | 5/1995 |
| JP | H0745858 B2 | 5/1995 |
| JP | H10339249 A | 12/1998 |
| JP | 3099973 B2 | 10/2000 |
| JP | 3371758 B2 | 1/2003 |
| JP | 2011102554 A | 5/2011 |
| WO | 2007003693 A1 | 1/2007 |
| WO | 2012032216 A1 | 3/2012 |

OTHER PUBLICATIONS

International Search Report, App. No. PCT/JP2014/083578, Filed Dec. 18, 2014, dated Mar. 24, 2015, 8 Pages.
First Office Action, App. No. 201480074555.9, dated Dec. 20, 2016.
Extended European Search Report, App. No. 14880995.7, dated Oct. 2, 2017, 8 Pages.

* cited by examiner

ABNORMALITY DIAGNOSIS APPARATUS AND ABNORMALITY DIAGNOSIS METHOD FOR INTERNAL COMBUSTION ENGINE SYSTEM

TECHNICAL FIELD

The present disclosure relates to an abnormality diagnosis apparatus and an abnormality diagnosis method for an internal combustion engine system. More specifically, it relates to an abnormality diagnosis apparatus and an abnormality diagnosis method for an internal combustion engine system which starts operation by supplying cylinders with compressed air stored in an accumulator.

BACKGROUND ART

Abnormality diagnosis apparatuses for an internal combustion engine system which starts operation by supplying cylinders with compressed air stored in an accumulator have been proposed. An abnormality diagnosis apparatus for an internal combustion engine system confirms whether inside of the accumulator is decompressed or pressurized, on the basis of an output signal from a pressure sensor which outputs a signal corresponding to the pressure in the accumulator. If it is confirmed that the pressure in the accumulator is decreasing, it is confirmed whether the decompression rate is faster than a standard decompression rate that accompanies starting of an internal combustion engine. If the decompression rate is faster than the standard decompression rate, it means that a great amount of compressed air is consumed during starting, and thus it is diagnosed that abnormality such as air leakage exists in a compressed-air supply system of the internal combustion engine. If compression inside the accumulator is confirmed, it is confirmed whether the compression rate is slower than a standard compression rate that accompanies accumulation of pressure in the accumulator. If the compression rate is lower than the standard compression rate, it means that abnormality exists in a compressor, and thus it is diagnosed that abnormality exists, such as malfunction of the compressor or air leakage in a compressed-air supply system of the internal combustion engine (see Patent Document 1, for instance).

CITATION LIST

Patent Literature

Patent Document 1: JPS63-295859A

SUMMARY

Problems to be Solved

However, the abnormality diagnosis apparatus and the abnormality diagnosis method of the internal combustion engine described above are for a compressed-air supply system for supplying compressed air for starting, and not for diagnosing an internal combustion engine. Thus, if a failure in starting of an internal combustion engine system is due to an internal combustion engine, it is difficult to find out an abnormal location in the internal combustion engine, and a long time is spent to determine the abnormal location.

At least one embodiment of the present invention was made in view of the above, and an object is to provide an abnormality diagnosis apparatus and an abnormality diagnosis method for an internal combustion engine system, capable of diagnosing starting of an internal combustion engine system, and in the event of a failure in starting, diagnosing an abnormal location efficiently.

Solution to the Problems

An abnormality diagnosis apparatus according to at least one embodiment of the present invention is for an internal combustion engine system comprising: a plurality of cylinders; an accumulator storing compressed air; an air duct connected to the accumulator; a main starting valve disposed in the air duct; a plurality of starting air ducts branched from the air duct downstream of the main starting valve, into the respective cylinders; a plurality of pilot valves connected to the respective starting air ducts, and configured to open to supply the cylinders with compressed air as starting air; a plurality of pilot air ducts connected to the respective pilot valves, and configured to supply compressed air for opening the valves as pilot air; and a starting air control valve connected to the air duct downstream of the main starting valve, and configured to supply pilot air to normal cylinders which should be supplied with starting air, serially via the pilot air ducts. The abnormality diagnosis apparatus comprises: a cylinder-pressure measuring unit configured to measure a cylinder pressure for each of the cylinders; a starting confirming unit configured to confirm whether the internal combustion engine system fails to start; a cylinder-pressure increase confirming unit configured to confirm an increase of the cylinder pressure for each of the plurality of cylinders, on the basis of a pressure measurement result of the cylinder-pressure measuring unit, if the starting confirming unit confirms a failure; a normal-cylinder confirming unit configured to confirm whether the cylinder for which the increase of the cylinder pressure is confirmed by the cylinder-pressure increase confirming unit is a normal cylinder; and a diagnosing unit configured to diagnose an abnormal location of the internal combustion engine system on the basis of confirmation results of the cylinder-pressure increase confirming unit and the normal-cylinder confirming unit.

In at least one embodiment of the present invention, the abnormality diagnosis apparatus confirms an increase in the cylinder pressure for each of the plurality of cylinders if the internal combustion engine system fails to start, and confirms whether the cylinder for which an increase in the cylinder pressure is confirmed is a normal cylinder. Then, the abnormality diagnosis system diagnoses an abnormal location of the internal combustion engine system on the basis of confirmation results on an increase in the cylinder pressure and on whether the cylinder with an increase in the cylinder pressure is a normal cylinder. Accordingly, it is possible to diagnose starting of the internal combustion engine system, and if the starting fails, to diagnose an abnormal location of the internal combustion engine system efficiently.

In an aspect of the present invention, the abnormality diagnosis apparatus further comprises: a pilot-air pressure measuring unit configured to measure a pressure of the pilot air supplied to each of the pilot valves; and a pilot-air pressure increase confirming unit configured to confirm a pressure increase of the pilot air on the basis of a pressure measurement result of the pilot-air pressure measuring unit. The diagnosing unit is configured to diagnose an abnormal location of the internal combustion engine system on the basis of a confirmation result of the pilot-air pressure increase confirming unit.

With this configuration, if the internal combustion engine system fails to start, the abnormal diagnosis system diagnoses an abnormal location of the internal combustion engine system on the basis of a confirmation result on a pressure increase of pilot air supplied to each of the pilot valves. Accordingly, it is possible to diagnose starting of the internal combustion engine system, and if the starting fails, to diagnose an abnormal location of the internal combustion engine system efficiently.

In an aspect of the present invention, the abnormality diagnosis apparatus further comprises: an accumulator-pressure measuring unit configured to measure a pressure of the compressed air stored in the accumulator; and a compressed-air consumption confirming unit configured to confirm consumption of the compressed air on the basis of a pressure measurement result of the accumulator-pressure measuring unit. The diagnosing unit is configured to diagnose an abnormal location of the internal combustion engine system further on the basis of a confirmation result of the compressed-air consumption confirming unit.

With this configuration, if the internal combustion engine system fails to start, the abnormal diagnosis system diagnoses an abnormal location of the internal combustion engine system on the basis of a confirmation result on consumption of compressed air stored in the accumulator. Accordingly, it is possible to diagnose starting of the internal combustion engine system, and if the starting fails, to diagnose an abnormal location of the internal combustion engine system efficiently.

A method according to at least one embodiment of the present invention is for diagnosing abnormality of an internal combustion engine which comprises: a plurality of cylinders; an accumulator storing compressed air; an air duct connected to the accumulator; a main starting valve disposed in the air duct; a plurality of starting air ducts branched from the air duct downstream of the main starting valve, into the respective cylinders; a plurality of pilot valves connected to the respective starting air ducts, and configured to open to supply the cylinders with compressed air as starting air; a plurality of pilot air ducts connected to the respective pilot valves, and configured to supply compressed air for opening the valves as pilot air; and a starting air control valve connected to the air duct downstream of the main starting valve, and configured to supply pilot air to normal cylinders which should be supplied with starting air, serially via the pilot air ducts. The method comprises: a step of confirming an increase of a cylinder pressure for each of the plurality of cylinders, if the internal combustion engine system fails to start; a step of confirming whether the cylinder for which the increase of the cylinder pressure is confirmed is a normal cylinder, if the increase of the cylinder pressure is confirmed; and a step of diagnosing an abnormal location of the internal combustion engine system on the basis of a confirmation result on whether the cylinder is a normal cylinder.

In at least one embodiment of the present invention, an increase in the cylinder pressure for each of the plurality of cylinders is confirmed if the internal combustion engine system fails to start, and it is confirmed whether the cylinder for which an increase in the cylinder pressure is confirmed is a normal cylinder. Then an abnormal location of the internal combustion engine system is diagnosed on the basis of confirmation results on an increase in the cylinder pressure and on whether the cylinder with an increase in the cylinder pressure is a normal cylinder. Accordingly, it is possible to diagnose starting of the internal combustion engine system, and if the starting fails, to diagnose an abnormal location of the internal combustion engine system efficiently.

In an aspect of the present invention, the method further comprises: a step of confirming a pressure increase of the pilot air supplied to each of the pilot valves; and a step of diagnosing an abnormal location of the internal combustion engine system on the basis of a confirmation result on the pressure increase of the pilot air, preferably.

According to this method, if the internal combustion engine system fails to start, an abnormal location of the internal combustion engine system is diagnosed on the basis of a confirmation result on a pressure increase in pilot air. Accordingly, it is possible to diagnose starting of the internal combustion engine system, and if the starting fails, to diagnose an abnormal location of the internal combustion engine system efficiently.

In an aspect of the present invention, the method of diagnosing abnormality further includes: a step of confirming consumption of the compressed air stored in the accumulator; and a step of diagnosing an abnormal location of the internal combustion engine system on the basis of a confirmation result on consumption the compressed air, preferably.

According to this method, if the internal combustion engine system fails to start, an abnormal location of the internal combustion engine system is diagnosed on the basis of a confirmation result on consumption of compressed air stored in the accumulator. Accordingly, it is possible to diagnose starting of the internal combustion engine system, and if the starting fails, to diagnose an abnormal location of the internal combustion engine system efficiently.

In an aspect of the present invention, the method of diagnosing abnormality further comprises: a step of performing a turning to differentiate phases between the plurality of cylinders, if the internal combustion engine system fails to start, and re-starting the internal combustion engine system; and a step of diagnosing an abnormal location of the internal combustion engine system on the basis of a result of re-starting.

According to this method, if the internal combustion engine system fails to start, an abnormal location of the internal combustion engine system is diagnosed on the basis of a result of re-starting. Accordingly, it is possible to diagnose starting of the internal combustion engine system, and if the starting fails, to diagnose an abnormal location of the internal combustion engine system efficiently.

Advantageous Effects

As described above, at least one embodiment of the present invention can diagnose starting of an internal combustion engine system, and if the starting fails, diagnose an abnormal location efficiently.

DETAILED DESCRIPTION

With reference to the accompanying drawings, suitable embodiments of a starting diagnosis apparatus and a starting diagnosis method according to the present invention will now be specifically described. The present invention should not limited by the following embodiments.

Figure 1:
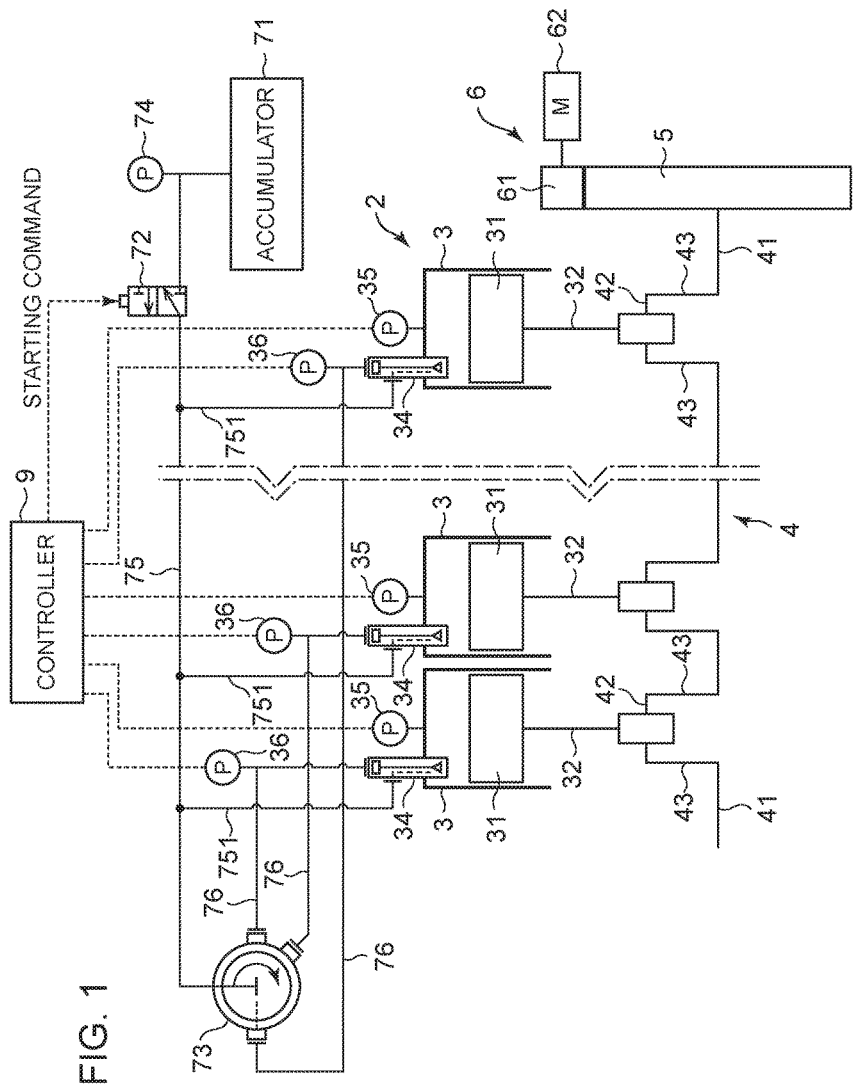
FIG. 1 is a schematic diagram of an internal combustion engine system to which a starting diagnosis apparatus and a starting diagnosis method for an internal combustion engine system according to an embodiment of the present invention are to be applied.
Figure 2:
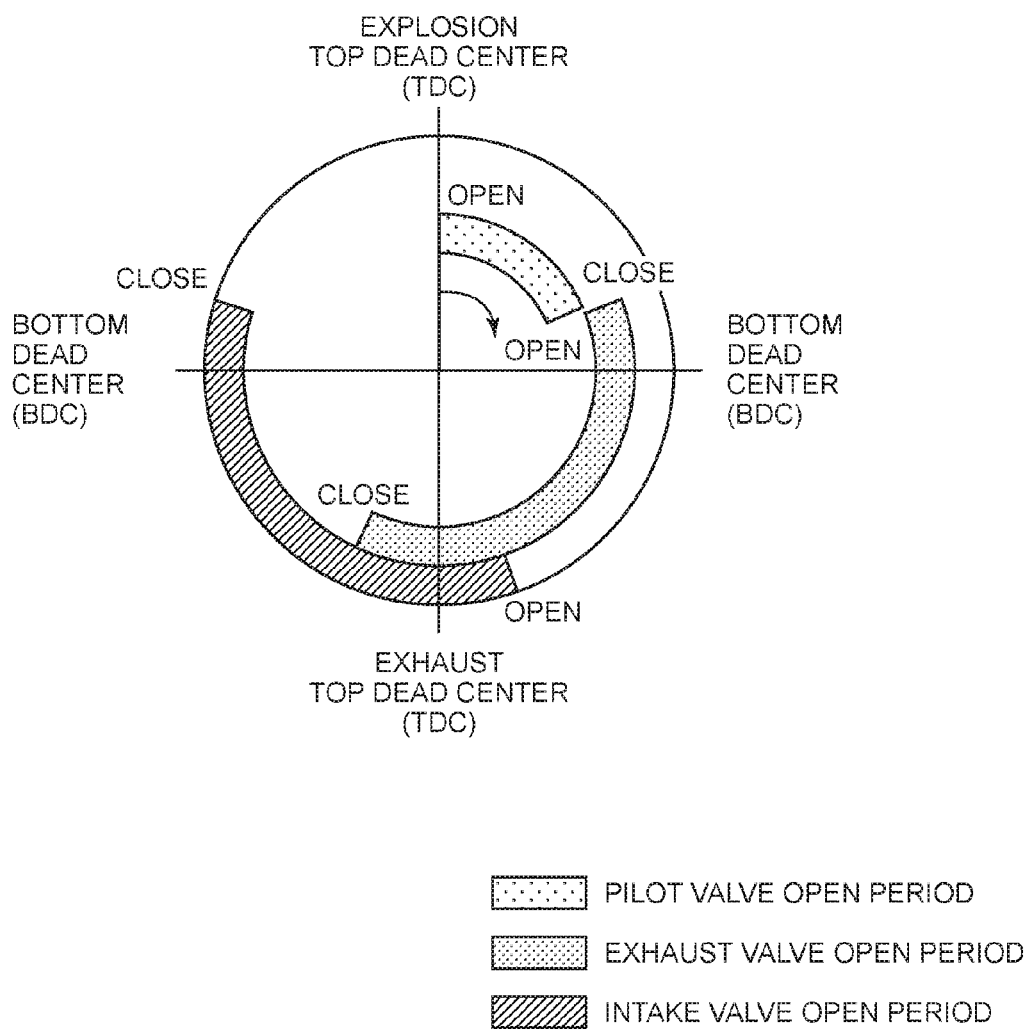
FIG. 2 is a diagram showing valve-opening timings of a pilot valve, an exhaust valve, and an intake valve.
Figure 3:
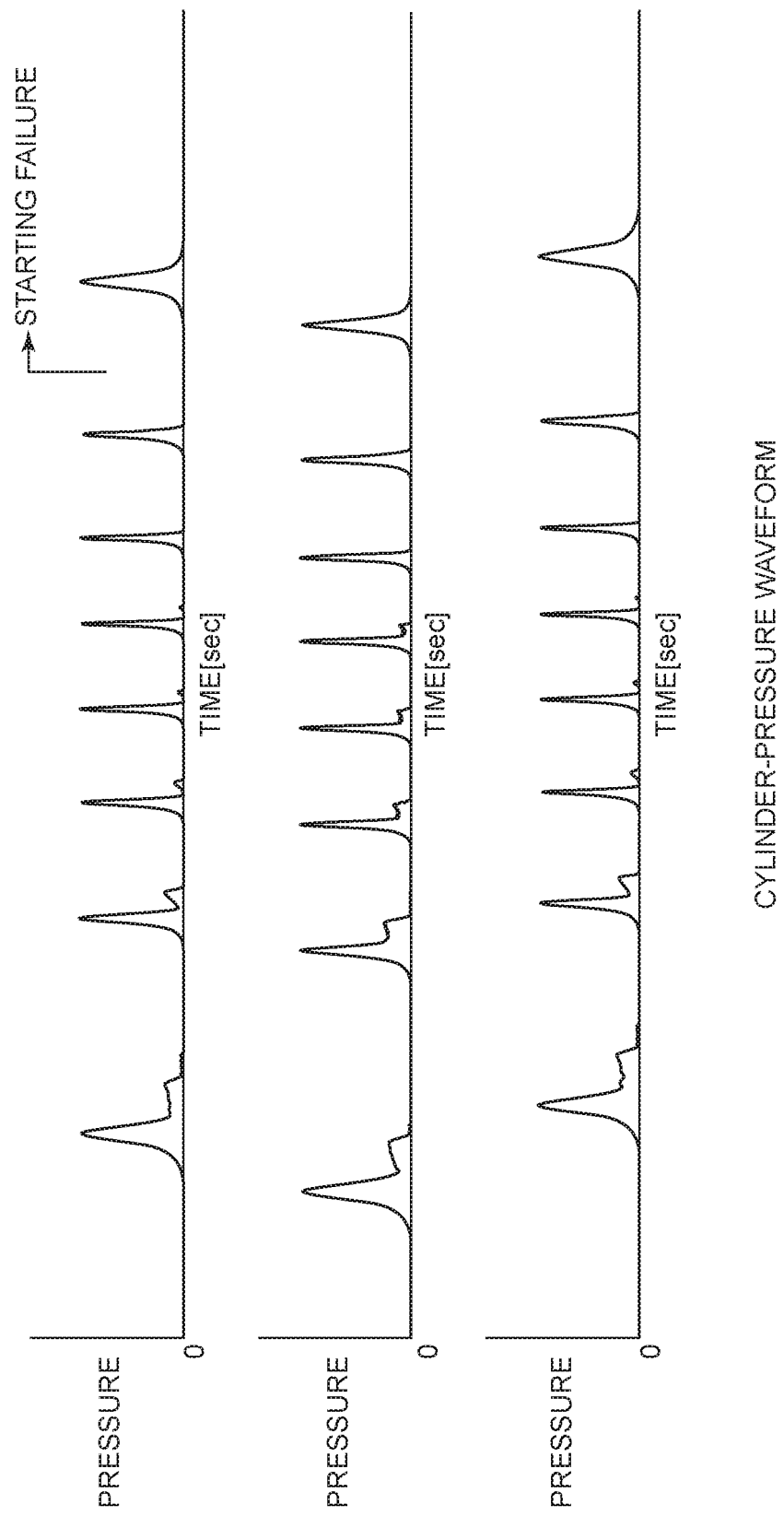
FIG. 3 is a diagram of pressure waveforms inside cylinders.

FIG. 1 is a schematic diagram of an internal combustion engine system to which a starting diagnosis apparatus and a starting diagnosis method for an internal combustion engine system according to an embodiment of the present invention are to be applied. FIG. 2 is a diagram showing valve-opening timings of a pilot valve, an exhaust valve, and an intake valve. FIG. 3 is a diagram of pressure waveforms inside cylinders.

An internal combustion engine system to which a starting diagnosis apparatus and a starting diagnosis method for an internal combustion engine system according to an embodiment of the present invention are to be applied stores compressed air in an accumulator temporarily and starts operation by supplying cylinders with the stored compressed air.

As depicted in FIG. 1, the internal combustion engine system according to an embodiment of the present invention includes an internal combustion engine 2, an accumulator 71, a main starting valve 72, a plurality of pilot valves 34, and a starting air control valve 73.

The internal combustion engine 2 includes a plurality of cylinders 3, each cylinder 3 having a piston 31 and a connecting rod 32, and the internal combustion engine 2 further comprises a crank shaft 4 and a flywheel 5 shared by the plurality of pistons 31 and connection rods 32.

The plurality of cylinders 3 are formed into a cylindrical shape, and the pistons 31 having a cylindrical shape reciprocate inside the respective cylinders 3. An end of each connecting rod 32 is coupled to corresponding one of the pistons 31, and the opposite end of each connecting rod 32 is coupled to the crank shaft 4. The crank shaft 4 is for converting reciprocal motion of the pistons 31 into rotational motion, in cooperation with the connecting rods 32, and includes a journal 41 that constitutes a rotational shaft and pins 42 to which the opposite ends of the connecting rods are coupled. The pins 42 are disposed parallel to an axis that passes through the center of the journal 41, and are each supported by a pair of arms 43. The flywheel 5 is for suppressing output fluctuation that takes place in accordance with a cycle of intake, compression, expansion, and exhaust, disposed on an end of the crank shaft 4.

Further, each of the plurality of cylinders 3 includes an intake valve and an exhaust valve, which are not depicted. An intake valve is for taking air into a cylinder, and is opened from a point before the exhaust top dead center (Before Top Dead Center; BTDC) to a point after the bottom dead center (After Bottom Dead Center; ABDC), as depicted in FIG. 2. An exhaust valve is for discharging combustion gas from a cylinder, and is opened from a point before the bottom dead center (Before Bottom Dead Center; BBDC) to a point after the exhaust top dead center (After Top Dead Center; ATDC).

Furthermore, as depicted in FIG. 1, a turning device 6 is disposed on an end of the crank shaft 4. The turning device 6 is for rotating the crank shaft 4 at a low speed, and includes a turning gear (not depicted) formed on a periphery of the flywheel 5, a driving gear 61 that engages with the turning gear, and a motor 62 that drives the driving gear 61.

The accumulator 71 is for storing air compressed by a compressor (not depicted), and is provided with a pressure sensor 74. The pressure sensor 74 is for measuring a pressure of compressed air stored in the accumulator 71.

An air duct 75 is connected to the accumulator 71. A main starting valve 72 is disposed on an upstream side of the air duct 75. The main starting valve 72 is a solenoid switch valve which opens in response to a starting command, and opens in response to a starting command during starting of the internal combustion engine. Furthermore, the air duct 75 includes a plurality of starting air ducts 751 branched into the respective cylinders 3 downstream of the main starting valve 72.

The plurality of pilot valves 34 are for supplying cylinders with compressed air supplied from the accumulator 71 as starting air during starting of the internal combustion engine system, and are provided for the respective cylinders 3. The starting air ducts 751 are connected to the respective pilot valves 34, and compressed air is supplied to the cylinders from the accumulator 71 by opening the pilot valves 34. Furthermore, pilot air ducts 76 for supplying pilot air for opening the pilot valves 34 are connected to the respective pilot valves 34.

The starting air control valve 73 operates in cooperation with the crank shaft 4 described above to supply pilot air serially to the cylinders 3 which should be supplied with starting air. The starting air control valve 73 is disposed downstream from the main starting valve 72 of the air duct 75, and the pilot air ducts 76 corresponding to the plurality of pilot valves 34 are each connected to the starting air control valve 73. The starting air control valve 73 is configured to permit communication between the air duct 75 and each of the pilot air ducts 76 serially. After the air duct 75 and one of the pilot air ducts 76 come into communication, compressed air of the air duct 75 is supplied to the pilot valve 34 via the pilot air duct 76 as pilot air. The pilot valve 34 opens in response to the supplied pilot air, and compressed air as starting air is supplied into the cylinder. Accordingly, the starting air control valve 73 supplies pilot air serially, to the cylinders which should be supplied with starting air. Herein, a cylinder which should be supplied with starting air is a cylinder that is in a range from when the piston 31 is at the explosion top dead center (TDC) to when the exhaust valve opens, and the starting air control valve 73 supplies pilot air serially to cylinders in such a condition Further, each of the plurality of cylinders 3 includes a pressure sensor 35. The pressure sensor 35 is for measuring a pressure inside a cylinder, is capable of measuring a pressure inside a cylinder successively, and can output the pressure in a waveform as depicted in FIG. 3.

Further, each of the pilot valves 34 includes a pressure sensor 36. The pressure sensor 36 is for measuring a pressure of pilot air to be supplied to the pilot valve 34, and is capable of measuring a pressure of pilot air successively.

Figure 4:
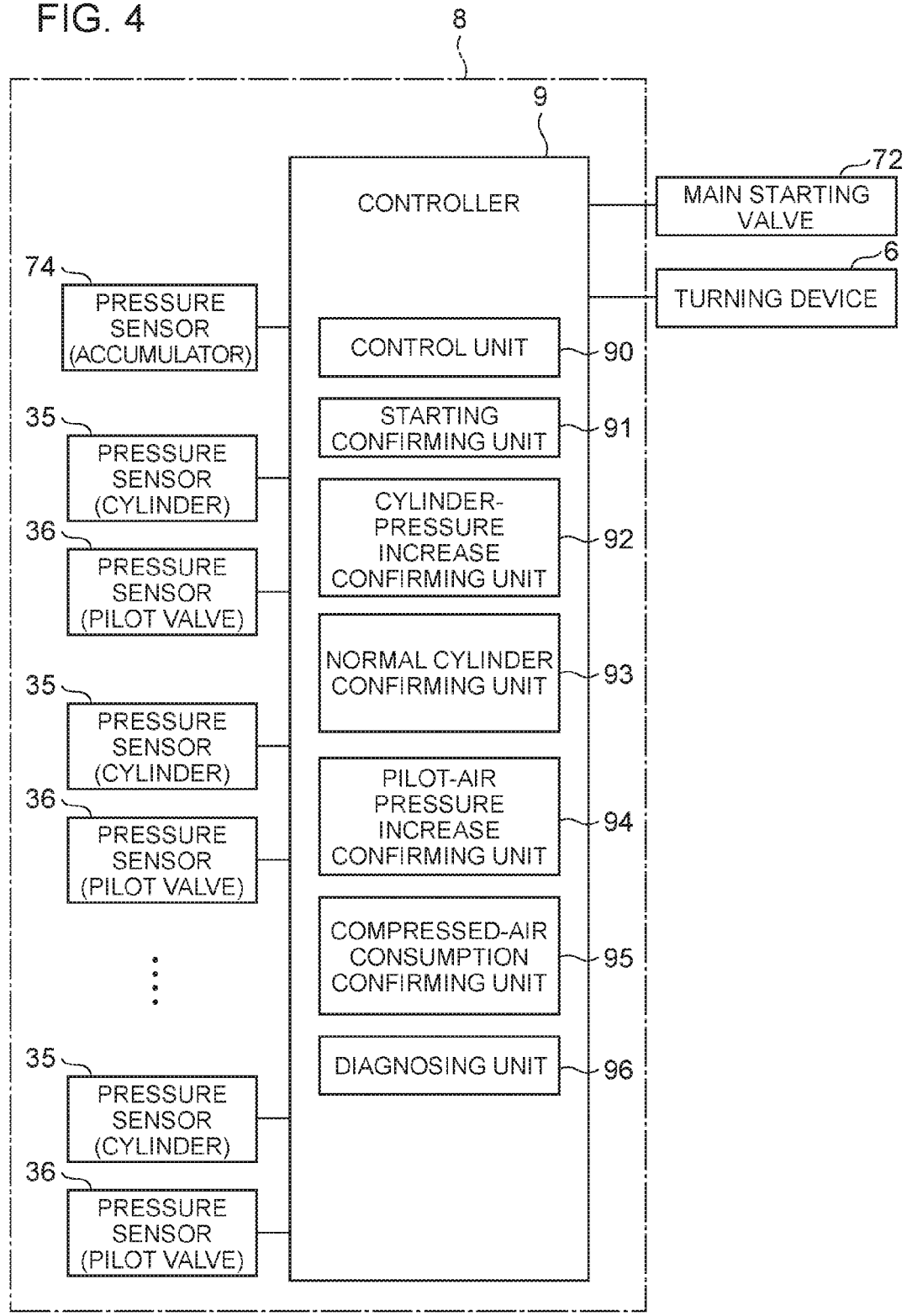
FIG. 4 is a block diagram of a starting diagnosis apparatus for an internal combustion engine system according to an embodiment of the present invention.

FIG. 4 is a block diagram of an abnormality diagnosis apparatus for an internal combustion engine system according to an embodiment of the present invention. The abnormality diagnosis apparatus 8 for an internal combustion engine system according to an embodiment of the present invention diagnoses starting of the internal combustion engine system, and if the starting fails, diagnoses an abnormal location.

As depicted in FIG. 4, the abnormality diagnosis apparatus 8 of the internal combustion engine system includes the pressure sensors 35 provided for the respective cylinders 3, the pressure sensors 36 provided for the respective pilot valves 34, the pressure sensor 74 disposed on the accumulator 71, and a controller 9. The controller 9 includes, for instance, a control device such as a programmable controller. The pressure sensors 35 provided for the respective cylinders 3, the pressure sensors 36 provided for the pilot valves 34, and the pressure sensor 74 disposed on the accumulator 71 are connected to the controller 9, and output measurement results to the controller 9 successively. Further, it is possible to send various command signals from the controller 9 to the main starting valve 72 and the turning device 6.

Furthermore, the controller 9 includes a control unit 90, a starting confirming unit 91, a cylinder-pressure increase confirming unit 92, a normal-cylinder confirming unit 93, a pilot-air pressure increase confirming unit 94, a compressed-air consumption confirming unit 95, and a diagnosing unit 96.

The control unit 90 is for controlling the main starting valve 72 and the turning device 6. In response to a command from the control unit 90, the controller 9 outputs a starting command to the main starting valve 72, and the controller 9 outputs a turning command to the turning device 6.

The starting confirming unit 91 is for confirming whether the internal combustion engine system fails to start, and performs the confirmation on the basis of whether the internal combustion engine 2 is rotating at a predetermined speed or more after a predetermined time after starting of the internal combustion engine.

The cylinder-pressure increase confirming unit 92 confirms an increase of a cylinder pressure for each of the plurality of cylinders 3, if the starting confirming unit 91 confirms a failure of starting. Specifically, the cylinder-pressure increase confirming unit 92 confirms an increase of a cylinder pressure for each of the plurality of cylinders 3, on the basis of a pressure-measurement result of the pressure sensor 35 provided for each cylinder 3.

The normal-cylinder confirming unit 93 confirms whether the cylinder for which an increase of a cylinder pressure is confirmed by the cylinder-pressure increase confirming unit 92 is a normal cylinder. A normal cylinder is the cylinder 3 that should be supplied with starting air, specifically, the cylinder with the piston 31 positioned in a range from the explosion top dead center (TDC) to a point before the bottom dead center (BBDC), where the exhaust valve opens.

The pilot-air pressure increase confirming unit 94 confirms a pressure increase of pilot air to be supplied to each of the plurality of pilot valves 34, if the starting confirming unit 91 confirms a failure of starting. Specifically, the pilot-air pressure increase confirming unit 94 confirms a pressure increase of pilot air for each of the plurality of pilot valves 34, on the basis of a pressure-measurement result of the pressure sensor 36 provided for each pilot valve 34.

The compressed-air consumption confirming unit 95 confirms whether compressed air stored in the accumulator 71 is consumed, if the starting confirming unit 91 confirms a failure of starting. Specifically, the compressed-air consumption confirming unit 95 confirms whether compressed air stored in the accumulator 71 is consumed, on the basis of a pressure-measurement result of the pressure sensor 74 provided for the accumulator 71. Specifically, consumption of compressed air is confirmed if the pressure measured by the pressure sensor 74 disposed on the accumulator 71 is at a predetermined pressure or less.

The diagnosing unit 96 diagnoses an abnormal location by using the control unit 90, the starting confirming unit 91, the cylinder-pressure increase confirming unit 92, the normal-cylinder confirming unit 93, the pilot-air pressure increase confirming unit 94, and the compressed-air consumption confirming unit 95.

Figure 5:
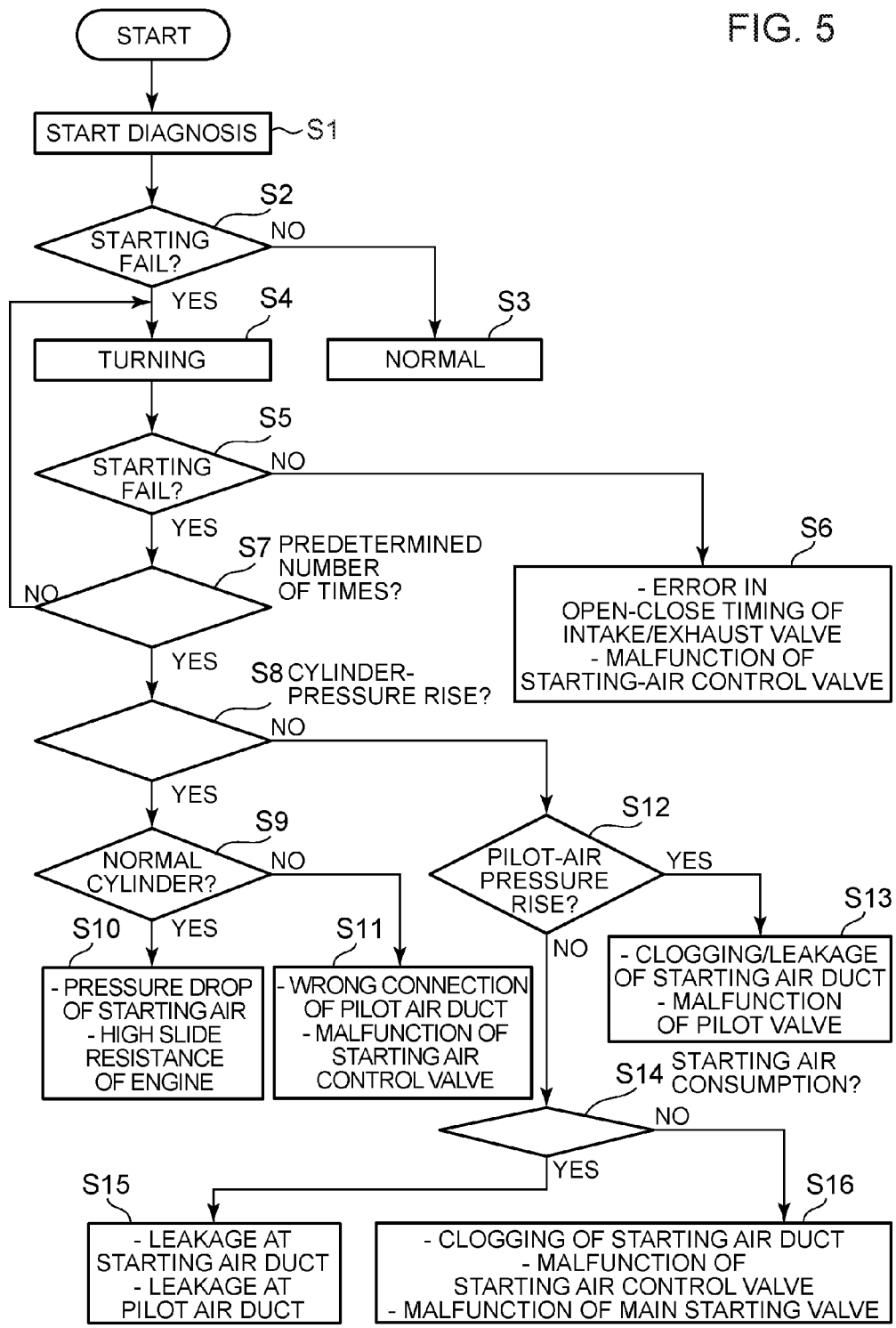
FIG. 5 is a flowchart of a method of diagnosis starting of an internal combustion engine system according to an embodiment of the present invention.

FIG. 5 is a flowchart of a method of diagnosing abnormality of an internal combustion engine system according to an embodiment of the present invention. The controller 9 diagnoses starting of the internal combustion engine system according to an embodiment of the present invention.

The internal combustion engine system starts operation in response to a starting command being outputted from the controller 9 to the main starting valve 72, and the abnormality diagnosis apparatus 8 starts diagnosis (step S1). If the abnormality diagnosis apparatus 8 starts diagnosis, the control unit 90 makes the starting confirming unit 91 confirm starting (step S2). The starting confirming unit 91 confirms starting on the basis of whether the internal combustion engine 2 is rotating at a predetermined speed or more after a predetermined time after starting of the internal combustion engine. If the internal combustion engine 2 is rotating at a predetermined speed or more, the starting confirming unit 91 confirms starting. At this time, the diagnosing unit 96 diagnoses that the internal combustion engine is normal (step S3). On the other hand, if the internal combustion engine 2 is not rotating at a predetermined speed or more, the starting confirming unit 91 confirms a failure of starting (step S2; YES). Further, if a failure of starting is confirmed, the diagnosing unit 96 diagnoses that some kind of failure exists in the internal combustion engine system.

If the starting confirming unit 91 confirms a failure of starting, the control unit 90 outputs a turning command from the controller 9 to the turning device 6. If a turning command is inputted to the turning device 6, the turning device 6 performs turning (step S4). Specifically, a motor 62 drives the driving gear 61 to rotate a flywheel including a turning gear on the outer periphery. Accordingly, the crank shaft 4 rotates and the pistons 31 move inside the respective cylinders 3, and thereby open-close states of the intake valves and the exhaust valves are changed. As a result, a state of the internal combustion engine 2 shifts to another state.

Then, the control unit 90 makes the starting confirming unit 91 confirm starting again (step S5). Now, if the starting confirming unit 91 confirms starting, the diagnosing unit 96 diagnoses a fault in an opening-closing timing of an intake valve or an exhaust valve, or malfunction of the starting air control valve 73 (step S6).

On the other hand, if the starting confirming unit 91 diagnoses a failure in starting in spite of the control unit 90 outputting a turning command to the turning device 6 from the controller 9 for a predetermined number of times (step S7: YES), the control unit 90 makes the cylinder-pressure increase confirming unit 92 confirm an increase of a cylinder pressure (step S8). The cylinder-pressure increase confirming unit 92 confirms an increase of a cylinder pressure for each of the plurality of cylinders 3, on the basis of a pressure-measurement result of the pressure sensor 35 provided for each cylinder 3. If the cylinder-pressure increase confirming unit confirms an increase in a cylinder pressure (step S8: YES), the normal-cylinder confirming unit 93 confirms whether the cylinder for which an increase of a cylinder pressure is confirmed by the cylinder-pressure increase confirming unit 92 is a normal cylinder (step S9).

If the normal-cylinder confirming unit 93 confirms that the cylinder is a normal cylinder (step S9: YES), the diagnosing unit 96 diagnoses a pressure decrease of starting air, or a high sliding resistance in the internal combustion engine (step S10). On the other hand, if the normal-cylinder confirming unit 93 diagnoses that the cylinder is not a normal cylinder (step S9: NO), the diagnosing unit 96 diagnoses wrong connection of the pilot air duct, or malfunction of the starting air control valve.

Furthermore, if the cylinder-pressure increase confirming unit 92 does not confirm an increase of the cylinder pressure (step S8: NO), the control unit 90 makes the pilot-air pressure increase confirming unit 94 confirm a pressure increase of pilot air (step S12). Specifically, the pilot-air pressure increase confirming unit 94 confirms a pressure increase of pilot air for each of the plurality of pilot valves 34, on the basis of a pressure-measurement result of the pressure sensor 36 provided for each pilot valve 34.

If the pilot-air pressure increase confirming unit 94 confirms a pressure increase of pilot air (step S12: YES), the diagnosing unit 96 diagnoses clogging or leakage of the starting air duct, or malfunction of the pilot valve (step S13).

Furthermore, if the pilot-air pressure increase confirming unit 94 does not confirm a pressure increase of pilot air (step S12), the control unit 90 makes the compressed-air consumption confirming unit 95 confirm consumption of compressed air (step S14). The compressed-air consumption confirming unit 95 confirms whether compressed air is consumed, on the basis of a pressure-measurement result of the pressure sensor 74 provided for the accumulator 71.

If the compressed-air consumption confirming unit 95 confirms consumption of compressed air (step S14: YES), the diagnosing unit 96 diagnoses leakage at the starting air duct, or leakage at the pilot air duct (step S15). If the compressed-air consumption confirming unit 95 does not confirm consumption of compressed air (step S14: NO), the diagnosing unit 96 diagnoses clogging of the starting air duct, malfunction of the starting air control valve, or malfunction of the main starting valve (step S16).

As described above, the abnormality diagnosis apparatus and the abnormality diagnosis method for an internal combustion engine system according to an embodiment of the present invention can diagnose starting of the internal combustion engine system, and if the starting fails, diagnoses an abnormal location efficiently.

INDUSTRIAL APPLICABILITY

As described above, at least one embodiment of the present invention is capable of diagnosing starting of an internal combustion engine system, and diagnosing an abnormal location efficiently in the event of a failure of starting, and thus can be suitably applied to an abnormality diagnosis apparatus and an abnormality diagnosis method for an internal combustion engine system which stores compressed air in an accumulator and starts operation by supplying cylinders with the stored compressed air.

DESCRIPTION OF REFERENCE NUMERALS

2 Internal combustion engine
3 Cylinder
31 Piston
32 Connecting rod
34 Pilot valve
35 Pressure sensor
36 Pressure sensor
4 Crank shaft
5 Flywheel
6 Turning device
61 Driving gear
62 Motor
71 Accumulator
72 Main starting valve
73 Starting air control valve
74 Pressure sensor
75 Air duct
751 Starting air duct
76 Pilot air duct
8 Abnormality diagnosis apparatus
9 Controller
90 Control unit
91 Starting confirming unit
92 Cylinder-pressure increase confirming unit
93 Normal-cylinder confirming unit
94 Pilot-air pressure increase confirming unit
95 Compressed-air consumption confirming unit
96 Diagnosing unit

The invention claimed is:

1. An abnormality diagnosis apparatus for an internal combustion engine system which comprises:
   a plurality of cylinders;
   an accumulator storing compressed air;
   an air duct connected to the accumulator;
   a main starting valve disposed in the air duct;
   a plurality of starting air ducts branched from the air duct downstream of the main starting valve, into the respective cylinders;
   a plurality of pilot valves connected to the respective starting air ducts, and configured to open to supply the cylinders with compressed air as starting air;
   a plurality of pilot air ducts connected to the respective pilot valves, and configured to supply compressed air for opening the valves as pilot air; and
   a starting air control valve connected to the air duct downstream of the main starting valve, and configured to supply pilot air to normal cylinders which should be supplied with starting air, serially via the pilot air ducts,
   the abnormality diagnosis apparatus comprising:
   a cylinder-pressure measuring unit configured to measure a cylinder pressure for each of the cylinders;
   a starting confirming unit configured to confirm whether the internal combustion engine system fails to start;
   a cylinder-pressure increase confirming unit configured to confirm an increase of the cylinder pressure for each of the plurality of cylinders, on the basis of a pressure measurement result of the cylinder-pressure measuring unit, if the starting confirming unit confirms a failure;
   a normal-cylinder confirming unit configured to confirm whether the cylinder for which the increase of the cylinder pressure is confirmed by the cylinder-pressure increase confirming unit is a normal cylinder; and
   a diagnosing unit configured to diagnose an abnormal location of the internal combustion engine system on the basis of confirmation results of the cylinder-pressure increase confirming unit and the normal-cylinder confirming unit.

2. The abnormality diagnosis apparatus for an internal combustion engine system according to claim 1, further comprising:
   a pilot-air pressure measuring unit configured to measure a pressure of the pilot air supplied to each of the pilot valves; and a pilot-air pressure increase confirming unit configured to confirm a pressure increase of the pilot air on the basis of a pressure measurement result of the pilot-air pressure measuring unit, wherein the diagnosing unit is configured to diagnose an abnormal location of the internal combustion engine system on the basis of a confirmation result of the pilot-air pressure increase confirming unit.

3. The abnormality diagnosis apparatus for an internal combustion engine system according to claim 1, further comprising:

an accumulator-pressure measuring unit configured to measure a pressure of the compressed air stored in the accumulator; and a compressed-air consumption confirming unit configured to confirm consumption of the compressed air on the basis of a pressure measurement result of the accumulator-pressure measuring unit, wherein the diagnosing unit is configured to diagnose an abnormal location of the internal combustion engine system further on the basis of a confirmation result of the compressed-air consumption confirming unit.

4. A method of diagnosing abnormality of an internal combustion engine system which comprises:

a plurality of cylinders;

an accumulator storing compressed air;

an air duct connected to the accumulator;

a main starting valve disposed in the air duct;

a plurality of starting air ducts branched from the air duct downstream of the main starting valve, into the respective cylinders;

a plurality of pilot valves connected to the respective starting air ducts, and configured to open to supply the cylinders with compressed air as starting air;

a plurality of pilot air ducts connected to the respective pilot valves, and configured to supply compressed air for opening the valves as pilot air; and a starting air control valve connected to the air duct downstream of the main starting valve, and configured to supply pilot air to normal cylinders which should be supplied with starting air, serially via the pilot air ducts, the method comprising:

a step of confirming an increase of a cylinder pressure for each of the plurality of cylinders, if the internal combustion engine system fails to start;

a step of confirming whether the cylinder for which the increase of the cylinder pressure is confirmed is a normal cylinder, if the increase of the cylinder pressure is confirmed; and a step of diagnosing an abnormal location of the internal combustion engine system on the basis of a confirmation result on whether the cylinder is a normal cylinder.

5. The method of diagnosing abnormality of an internal combustion engine system according to claim 4, further comprising:

a step of confirming a pressure increase of the pilot air supplied to each of the pilot valves; and a step of diagnosing an abnormal location of the internal combustion engine system on the basis of a confirmation result on the pressure increase of the pilot air.

6. The method of diagnosing abnormality of an internal combustion engine system according to claim 4, further comprising:

a step of confirming consumption of the compressed air stored in the accumulator; and a step of diagnosing an abnormal location of the internal combustion engine system on the basis of a confirmation result on consumption the compressed air.

7. The method of diagnosing abnormality of an internal combustion engine system according to claim 4, further comprising:

a step of performing a turning to differentiate phases between the plurality of cylinders, if the internal combustion engine system fails to start, and re-starting the internal combustion engine system; and a step of diagnosing an abnormal location of the internal combustion engine system on the basis of a result of re-starting.

* * * * *